United States Patent [19]

Ferguson et al.

[11] Patent Number: 4,684,349

[45] Date of Patent: Aug. 4, 1987

[54] AUDIO-VISUAL TEACHING SYSTEM AND METHOD

[75] Inventors: Frank W. Ferguson, 2772 S. Randolph St., Arlington, Va. 22206; Kenneth R. Herrity, Falls Church, Va.

[73] Assignee: Frank Ferguson, Arlington, Va.

[21] Appl. No.: 889,701

[22] Filed: Jul. 28, 1986

Related U.S. Application Data

[63] Continuation of Ser. No. 580,509, Feb. 15, 1984, abandoned.

[51] Int. Cl.[4] .............................................. G09B 5/06
[52] U.S. Cl. .................................... 434/308; 434/335
[58] Field of Search ................................ 434/308, 335

[56] References Cited

U.S. PATENT DOCUMENTS

| | | |
|---|---|---|
| 3,353,280 | 11/1967 | Emde . |
| 3,408,749 | 11/1968 | Brudner . |
| 3,483,633 | 12/1969 | Geils et al. . |
| 3,504,445 | 4/1970 | Goldmark et al. . |
| 3,591,930 | 7/1971 | Little et al. . |
| 3,623,238 | 11/1971 | LaPlume et al. . |
| 3,715,811 | 2/1973 | Thompson et al. . |
| 3,718,759 | 2/1973 | Reiffel . |
| 3,718,984 | 3/1973 | Hewitt . |
| 3,718,986 | 3/1973 | Hewitt . |
| 3,720,005 | 3/1973 | Roche . |
| 3,721,493 | 3/1973 | Schneiderman et al. . |
| 3,733,717 | 5/1973 | Montgomery et al. . |
| 3,773,415 | 11/1973 | Carabet et al. . |
| 3,803,728 | 4/1974 | Scott ................................ 434/308 |
| 3,805,412 | 4/1974 | Lambright et al. . |
| 3,829,987 | 8/1974 | Matzsek . |
| 3,871,757 | 3/1975 | Glass et al. . |
| 3,932,948 | 1/1976 | Goddard et al. . |
| 3,953,118 | 4/1976 | Bruchenko . |
| 3,996,671 | 12/1976 | Foster . |
| 4,005,530 | 2/1977 | Takahashi et al. . |
| 4,043,054 | 8/1977 | Crowder . |
| 4,052,798 | 10/1977 | Tomita et al. . |
| 4,122,613 | 10/1978 | Karalus et al. . |
| 4,143,879 | 3/1979 | Wren . |
| 4,256,955 | 3/1981 | Giraud et al. ....................... 235/492 |
| 4,305,131 | 12/1981 | Best . |
| 4,482,328 | 11/1984 | Ferguson et al. ................... 434/335 |
| 4,490,810 | 12/1984 | Hon ..................................... 434/308 |

Primary Examiner—Leo P. Picard
Attorney, Agent, or Firm—Jones, Tullar & Cooper

[57] ABSTRACT

Improved audio-visual display systems are disclosed. A lesson program in audio frequency form recorded on a storage medium provides control data and narrative information. The control information provides data to the system about the particular lesson program, including the visual images which are to be associated with the narrative information. The control data also provides information concerning the responses expected from users of the system, and instructions for alternative steps available which are prescribed in accordance with a users actual responses. The lesson program may be arranged in chapters which include control data and corresponding narrative information. Separate visuals may be provided, with images indexed for selection by the control data.

12 Claims, 9 Drawing Figures

AUDIO-VISUAL TEACHING SYSTEM AND METHOD

This is a continuation of application Ser. No. 580,509 filed Feb. 15, 1984, now abandoned.

BACKGROUND OF THE INVENTION

The present invention relates, in general, to improvements in audio-visual display systems and more particularly to systems and methods for the teaching and testing of students wherein the display of visual information is coordinated with related audio information in the form of voice narration to provide structured teaching of material and testing of student progress. The system and method further includes automatic revision of the teaching sequence through branching and/or repetition in response to student progress.

With the advent of the microprocessor and related peripheral equipment for supplying data to such processors and for utilizing the information produced thereby in the form of visual displays, the field of audio-visual teaching systems has expanded rapidly to the point where relatively inexpensive systems are becoming widely available. The lightweight, portable, easy-to-use machines now becoming available are in great demand for use with the educationally disadvantaged, particularly in developing countries. However, the systems available to date have not been entirely satisfactory for such uses, since they tend to be overly complex and often are of uncertain reliability. Further, many such devices are developed essentially for use as games and for entertainment purposes, and do not take full advantage of the capability of such devices for providing significant educational advantages.

In order to maximize the usefulness of an audio-visual system in the teaching process, it is necessary to provide a continuing check on the progress of the student and to provide variations in or repetition of the teaching steps as needed by the individual student, rather than as preprogrammed by a remote and unknowing programmer. Thus, the microprocessor systems and home computer systems that might otherwise be useful in teaching, but which instead are designed primarily for entertainment, do not meet the real needs of students who, for example, cannot read or write, or who have no idea how to operate a computer.

Although presently existing systems are extremely useful and in many respects have been very successful, they have not met the needs of the disadvantaged. One system designed for this latter purpose is described in U.S. patent application Ser. No. 352,917 of Frank W. Ferguson et al, filed Feb. 26, 1982, entitled "Improved Audio-Visual Teaching Machine and Control System Therefor", which application is assigned to the assignee of the present application. In that application a system is disclosed for recording audio information on a storage medium, which information includes both control data and voice narration. In the preferred form of that invention, the control data is interspersed between narration segments so that each section, or chapter, of the information on the storage medium incorporates data and accompanying narration, both relating to specific corresponding visual displays. Although the system described in that application works extremely well, it has been found to have some limitations in its adaption to "state of the art" audio and optical equipment.

SUMMARY OF THE INVENTION

It is, therefore, an object of the present invention to provide an improved audio-visual teaching system.

It is a further object of the invention to improve upon the audio-visual system disclosed in U.S. patent application Ser. No. 352,917 and thus to provide a teaching method and system which is flexible, simple to use, inexpensive, and which is capable of using existing peripheral equipment for providing the desired visual displays which accompany recorded narrative lessons.

It is another object of the invention to provide a system and method of programmed learning that is simple, inexpensive, which provides for variations in the teaching sequence in accordance with student response, and which is adapted to use existing equipment such as microprocessor systems, home computer systems, and the like.

Briefly, the present invention relates to a teaching system and method utilizing a lesson program, or plan which incorporates coordinated audio and visual information. The audio information includes control data in the form of coded audio frequency signals as well as narrative information in the form of voice instructions and questions, the audio frequency information being recorded on a suitable storage medium such as magnetic tape and playable through conventional tape recorders. The control information provides data to the system about the particular lesson, or tutoring program, to which it is directed so that the system becomes responsive to that program. The control data also provides information concerning the responses expected from the student as well as instructions concerning alternative steps available in the lesson program which can be taken in accordance with the student's response to the current lesson segment. The audio frequency data also provides information to permit coordination of the narration with the visual display.

In one form of the invention, the visual display to be used with a particular tutoring program is in the form of a printed booklet, film strip, or like permanent record which is indexed to correspond to indexing signals provided by the program. Alternatively, the audio control data may be used to call up corresponding graphical displays on a cathode ray tube monitor, television set or the like, as required for a particular narrative segment. The lesson program storage medium (i.e., magnetic tape) may be used with a dedicated display system which is designed specifically for use as a part of the teaching system of the present invention, or may utilize an existing microprocessor system or computer system preprogrammed in accordance with the invention to enable it to receive the audio frequency control data. The latter existing systems each require an individually-tailored conversion program and interface hardware specific to the microprocessor or computer system being used to enable the system to respond to the audio frequency control data provided in accordance with this invention. The conversion programs may be supplied thereto by means of a read only memory package (ROM) which may be plugged into an existing computer or microprocessor system to preprogram it for this purpose.

More particularly, the system of the present invention includes a master controller which incorporates a decoder adapted to receive audio frequency information and convert it to digital signals for use by a microprocessor also incorporated in the master controller. An audio amplifier is included to amplify the narration segments which provide voice instruction and questions to the user of this system. The microprocessor is preprogrammed by a suitable read only memory which provides the necessary control program, including subroutines, for operating the system. A keyboard is provided to permit user interface with and input to the microprocessor in response to the narration segments of a lesson, and a suitable display is provided for the index numbers which correspond to the graphics to be used with the current lesson segment. The display also indicates the user response, provides indications of the number of errors and, if the errors exceed a predetermined value, the prescription; i.e., the next step to be taken by the student. Such a prescription may be an instruction to go back to the beginning of the lesson chapter in progress, to shift to another chapter in the lesson, or to go to another lesson altogether, and provides branching of the predetermined lesson plan.

Audio frequency data signals are supplied to the master controller from the lesson program by means of a conventional tape recorder or other suitable playback medium. Preferably, a stereo tape recorder is used so that one track can be used for providing the necessary audio frequency information for both the computer and the system operator, while the other track contains audio frequency markers which can be used to locate particular segments of the audio information on the first track. With this arrangement, various segments of the recorded lesson or tutoring program can be automatically located; for example in response to a prescription.

To prevent unauthorized use of the system, a "key card" having a solid state memory circuit is provided. The card is adapted to be plugged into the master controller or to be interposed between the tape recorder and the master controller. The memory circuit on the key card provides information necessary to decode and to correctly interpret instructions received from a particular lesson program tape, the master control being inoperative in the absence of that information. A key card is provided with each lesson tape so that only the holder of the card can operate the system with that tape. In this way counterfeiting of lesson tapes is prevented.

The master controller is adapted, in a second embodiment of the invention, to produce output index signals which may be supplied to existing microprocessor devices, home computers, and the like whereby such devices may be used in conjunction with the present system to provide at least a part of the graphics for a lesson program. In this embodiment, the existing computer system must be programmed to accept the indexing information, and in response thereto to provide the corresponding graphic display. The necessary programming may be provided in the master control through a ROM control program, or may be provided by a separate ROM control program cartridge connectable to the existing computer system in conventional manner. Such a system may be used in conjunction with a film strip, book, or the like providing some of the graphics required for the present teaching system, with the computer display providing the remaining graphics, or in the alternative all of the required graphical symbols, words, and the like may be provided on the monitor screen of the computer system.

A third alternative is the programming of an existing microprocessor system, home computer, or the like to respond directly to the audio frequency signals provided by a lesson program tape. A converter program is provided in a ROM pack or cartridge which may be plugged into the microprocessor system in a conventional manner to provide programming for that processor which, in effect, converts it to functions provided by the master control unit. Since such systems conventionally include keyboards, such programming, among other things, selects specified keys for use by the student in responding to the narrative provided by the lesson tape. The processor system responds to the indexing signals provided by the lesson program tape to produce a graphic display which may provide all of the visual symbols required for the lesson, or which may be used in conjunction with a separate film strip, booklet, or the like, as previously explained.

In still another embodiment of the invention, the visual display and the audio frequency lesson and control data are provided on a conventional video tape which may be connected through a television monitor to the master control described above. Audio frequency signals are then supplied to the master control from the audio output of the television, while the corresponding graphics are displayed on the TV screen. The master control incorporates the keyboard and student progress displays discussed above to record and monitor student progress and, in addition, provides signals to the video tape machine to advance it as required to produce the required audio signals, as well as to provide the coordinated visual displays.

The master control, and its included microprocessor, responds to control information carried by the storage medium to operate the audio-visual system in accordance with instructions provided by that control information and, in addition, in accordance with predetermined procedures or subroutines which are stored in the microprocessor and which are called up by the control information. In the preferred form of the invention the control data portion of the audio frequency information carried by the storage medium is in the form of data words interspersed between the narrative portions of a lesson program tape. Since the relevant program information is immediately available before or after each narrative segment, the operator can skip or repeat any part of the lesson and the master control will automatically synchronize with the narrative segment just output. Also, the system will not require as much memory since only a small portion of the program information needs to be stored at any given time. As an alternative, lesson program information (correct responses, chapters, frames) and/or other information intended to enhance the lesson, such as graphic or textual displays for systems which have such capabilities, may be located at the beginning of the lesson storage medium and transferred to the microprocessor before the narrative portions are reached. This stored information can then be referenced by either shortened data words, as in the case where lesson program information has been previously stored, or normal data words in cases where it would be impractical to place all the necessary graphic and textual information between the narrative segments. However, this alternative would require a larger processor memory than the preferred form.

The data words carried on the lesson storage medium are a coded series of audio frequency signal bursts which, after decoding, are used to provide instructions to the microprocessor as required to operate the audio-visual system in a selected pattern which is predetermined by the lesson plan, but which may be varied in accordance with the user's responses to the lesson. The data is also used to operate the storage medium to cause it to follow the lesson plan as predetermined or as varied by the student response. In the preferred form, the data word is formatted to have a 16 bit recognition pattern to distinguish data signals from the narrative signals, with the recognition pattern being followed by 24 bits of data. This recognition pattern ensures that the microprocessor will not be inadvertently activated by the narrative.

A data word can, among other things, select one of the plurality of modes of operation of which the machine is capable. Thus, for example, a data word may instruct the microprocessor to follow a specified subroutine stored in a read only memory (ROM) of the microprocessor, this ROM storage capacity permitting some patterns of operation to be called up by relatively short data words to thereby conserve recording time in the storage medium. Although in a preferred form of the invention some routines will be established within the microprocessor in permanent form, a read/write memory can be provided into which new or modified subroutines can be stored from an external source such as a ROM pack, a magnetic tape source, or the like, to permit new programs of operation to be developed, thus allowing the master control microprocessor to be continuously updated to accommodate new lesson plans and concepts, and to provide the necessary programming to enable the master control to be interfaced with existing computer systems for maximum flexibility of operation.

The invention provides two distinct modes of operation; a teaching mode, and a testing mode. For purposes of this disclosure, it will be assumed that a teaching mode refers essentially to automatic operation wherein a predetermined sequence of visual displays is accompanied by a correspondingly predetermined sequence of narratives, providing voice instructions which relate to the selected visual displays. The visual portion of the lesson may be in the form of indexing indicia provided by the master control, with the user then manually selecting the appropriate display from a film strip, booklet, or the like, or may, in other forms, automatically call up corresponding graphical illustrations which are then displayed on a suitable monitor. In the automatic mode, the device proceeds through an entire audio-visual lesson without modification by the user of the machine. In this way, the desired information is provided in the desired sequence and the user simply learns from the displayed information.

On the other hand, a testing mode, for purposes of this disclosure, may be considered to be an operation wherein a user response is required in the lesson sequence. In such a case, for example, an audible question may accompany a visual display, with a reply by the machine operator (or student) being required before the program will advance to the next step. The testing mode does not require a response to a question in all cases, but does require some operator participation. In the testing mode, the sequence of visual displays and the corresponding sequence of narratives may be varied in accordance with the particular operator response. Thus, for example, if a question is asked and the response is not that which is expected in the lesson plan, the next visual display may be different than if the answer had been correctly given. It will be understood that a teaching mode may in reality also require operator response, but a distinction between these two modes is made herein for purposes of clarity.

To carry out the teaching and testing modes of operation, a variety of subroutines are stored in the read only memory of the microprocessor system which forms a part of the master control. Examples of suitable subroutines are as follows:

(a) "Display Select" is a subroutine which selects the visual display required by the control information which is currently operating the system. This control information may be derived directly from the storage medium, when normal data words are used, or may be called from the microprocessor memory by a shortened data word after having been stored there at the beginning of the lesson. The Display Select subroutine does not require a response by the user, but simply activates a visual display controller, when the visual display is directly controlled by the microprocessor, or provides a visual readout of the index which corresponds to the visual display that is to be manually selected by the operator.

(b) "Response Go To" is a subroutine which requires a correct answer from the use before the visual display (or the display index) is advanced to the next frame selected by the data word, and the audio is restarted. In accordance with this subroutine, the machine operator must respond to a question in a specified manner in order to progress through the lesson.

(c) "Manual Go To" is a subroutine which allows the operator to change the lesson sequence according to his needs. The subroutine, which is called by pressing an appropriate key on the keyboard, will cause the microprocessor system to synchronize with data words which are taken out of the normal program sequence because the operator has manually jumped forward or backward on the lesson storage medium. For embodiments where the storage medium was under the systems complete control, these jumps would be specified by the user through the keyboard but implemented by the system.

(d) "Chapter Header" is a subroutine which responds to the receipt of a data word which identifies the beginning of a section of the storage medium. In a preferred form of this invention, the storage medium and the visual displays are divided into a plurality of sections, with each section relating to a specified subject matter. Each of the sections, or chapters, may include a number of questions and required responses relating to the chosen subject, with the subroutine keeping track of the number of errors made by the machine operator. If the number of errors exceeds a predetermined number, a prescription indicator may be activated. This indicator may be a flashing light, a message to the user to select another audio-visual lesson program, may refer the user to an instruction book, may produce a reversal of the storage medium to a preceding chapter, or may provide any other defined function.

A variety of other subroutine modes of operation may be provided, as required. For example, a search mode subroutine may be provided to synchronize the visual display (or index) with the audio and to blank out the audio until such synchronization is obtained. This mode may be used each time the system is indexed to a new chapter either manually or in response to a data word instruction. Further, the subroutine may include "filler" chapter header instructions to enable the machine to present information even if a chapter header data word is missed when the machine is activated.

Other available modes may include an unconditional print subroutine which permits information such as the responses made to various questions or the total number of errors made to be printed on a hard copy printer. In addition, various blanking modes may be provided to permit the user to skip certain parts of the audio narrative on the storage medium, depending upon the user's response to prior questions.

The decoder circuitry provided in the master control responds to the audio frequency word signals produced by the storage medium to convert those signals into a digital form usable by the microprocessor. The decoder further operates to produce a time base pulse train which is supplied to the microprocessor to serve as the time base for pulse recognition of the data signals. This time base reconstruction permits asynchronous operation of the system so that it will function to distinguish the data signals from the narrative signals and from background noise.

The microprocessor responds to the data input which it receives from the storage medium and to inputs received from the manually operated control keys to produce output signals which control the storage medium, which control additional processors or computers, and which control the various light emitting diode (LED) displays provided on the master control. These latter displays are provided to indicate which portion of the storage medium is currently operating (i.e., the chapter and frame), to indicate the number of errors that have been made by the operator either in a given chapter or cumulatively, to provide an index number for the visual display being used so that the operator can select the proper film strip or book page, or can confirm that an automatically made selection is correct, and further to indicate what action the operator is to take if the permissible number of errors has been exceeded. The microprocessor and the master control also provide an output to an external jack to which a hard copy printer may be connected to permit the printing of a permanent record of, for example, the specific responses made by the machine operator. If desired, this output may also be connected to a modified hand-held calculator for storage of such information and subsequent determination of patterns of errors and other information relating to the learning ability and progress of the operator.

BRIEF DESCRIPTION OF THE DRAWINGS

The foregoing and additional objects, features and advantages of the present invention will become apparent from a more detailed consideration of the invention taken in conjunction with the accompanying drawings, in which.

DESCRIPTION OF PREFERRED EMBODIMENTS

Figure 1:
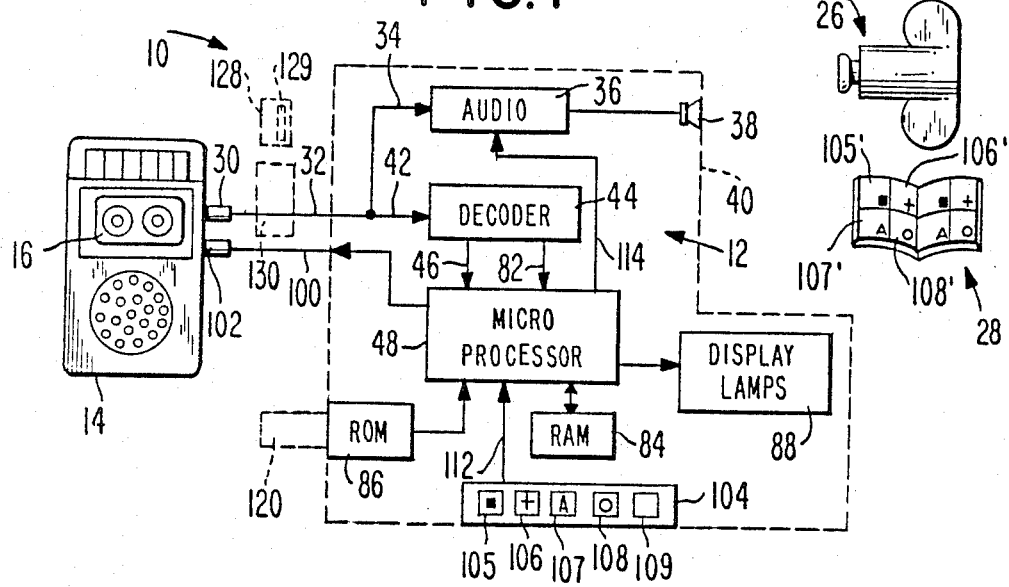
FIG. 1 is a diagrammatic illustration of a preferred form of the system of the present invention.

Turning now to a more detailed consideration of preferred embodiments of the present invention, FIG. 1 illustrates at 10 a preferred form of an audio-visual system constructed in accordance with the present invention. The system includes a master controller 12 to which is connected a conventional tape recorder/player 14 which may be a portable cassette-type machine. The recorder 14 is adapted to receive conventional tape cassettes 16 which carry prerecorded lesson plans for use in tutoring students in any desired subject matter area. These lessons are in the form of audio frequency information signals including not only narrative information but control information in the form of data words. The information is arranged into chapters and frames, the chapters being directed to related subject matter segments of the lesson plan, and the frames being subdivisions of a chapter.

Figure 2:
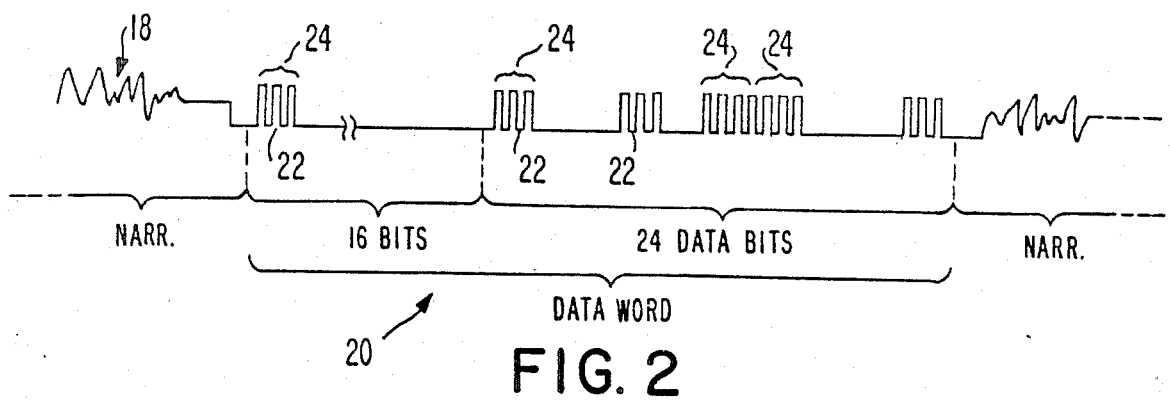
FIG. 2 is a diagrammatic illustration of the format of the audio frequency information contained in a lesson.

In the preferred form of the invention, the audio frequency data portions which provide the control information required to operate the master controller are interposed between the narrative segments of the audio frequency information signals, as diagrammatically illustrated in FIG. 2. Thus, a narrative portion 18 generally consists of audio frequency signals which may represent voice signals to be reproduced by a loudspeaker thereby to provide audible instructions or questions to be answered by the user of the system. At the end of the narrative segment 18, a data word 20 is provided which comprises, in a preferred form of the invention, a series of constant amplitude tone bursts 22, each tone burst being a predetermined audio frequency. Each burst forms a substantially square wave pulse or data bit 24, the data bits being arranged in a coded pattern to provide the information required by the master controller.

In one form of the invention, the data word 20 may consist of 40 data bits, with the first 16 bits providing a recognition pattern for the master controller to enable it to distinguish between narrative and control signals. This recognition pattern may also include a squelch code which serves to block the audio frequency amplifier (to be described), thereby to prevent the data bits from being fed to the loudspeaker. Alternatively, the audio squelch can be activated by a tone burst of a predetermined frequency (for example 75 Hz) appearing just before the data word.

Following the recognition pattern portion of the data word is a control pattern which consists of 24 data bits providing the required information for the master controller. Such control information may include, for example, instructions to cause the controller 12 to provide an appropriate index display which will identify a specific visual record, such as a film strip or a booklet, that will correspond to the next following narrative portion. The control information may include instructions to control the operation of the cassette recorder 14, may establish in the controller memory the answers to any questions to be asked in the next narrative segment, may call up a particular subroutine for use in determining operator errors and for displaying prescriptions determined by the pattern of the operator's response, and may provide such other operational instructions as may be required by the particular master controller.

At the end of the data word, the tape recorder 14 may be stopped briefly to allow the operator to adjust a film strip in a manually operated film holder 26 to the identified frame or to turn the pages of an accompanying booklet 28 to the chapter and page number which correspond to the narrative portion of the lesson plan which is next to be played by the tape recorder. The tape may then resume after a predetermined time or may be restarted by an appropriate manually operated control button (not shown) on the master controller 12. By indexing the visual display on the film holder or booklet to the recorded narrative, the correct visual display for the narrative portion will be displayed for use by the student.

Preferably, the film holder 26 is a manually operable film strip viewer of conventional type which is adapted to receive film strips specially prepared to incorporate visual images corresponding to the lesson plan on a particular magnetic tape cartridge. The film strip is loaded into the viewer and is advanced to display the particular frame called for by the chapter and frame of the lesson. Alternatively, or conjointly, a booklet 28 may be used in a similar manner, with the chapters and pages in the booklet carrying visual images corresponding to the chapters and frames of the narration.

Figure 3:
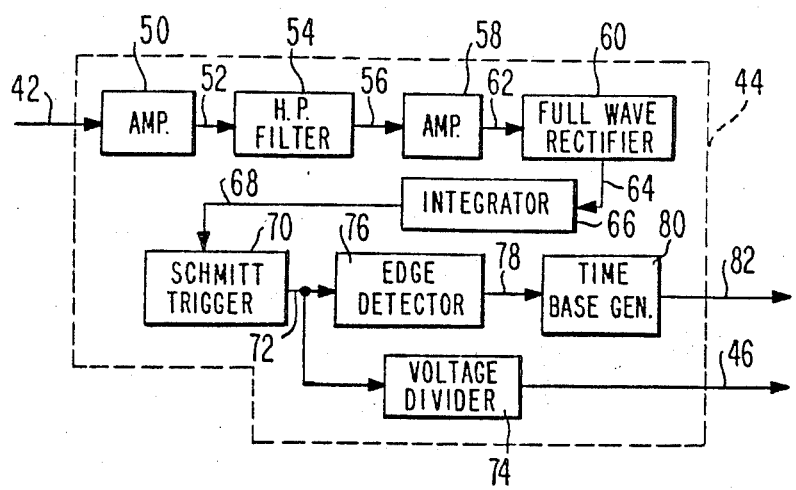
FIG. 3 is a block diagram of a decoder suitable for use in the system of FIG. 1.

The master controller 12 is connected to the output jack of the magnetic tape recorder 14 by means of a plug 30 and lead line 32, whereby output audio frequency signals produced by the cassette 16 are supplied to the master controller. The signals supplied to the controller 12 are fed by way of line 34 to the input of an audio frequency amplifier 36, the output of which is connected to a loudspeaker 38 preferably mounted in the housing of the master controller, which housing is diagrammatically illustrated by the dotted line 40. The input line 32 is also connected by way of line 42 to a decoder 44 of the type described in U.S. application Ser. No. 352,917, mentioned above. The decoder converts the audio frequency signals on line 42 to data bit pulses which appear on its output line 46 and which are supplied to a microprocessor 48. As illustrated in FIG. 3, the decoder includes an amplifier 50 which receives the audio frequency signals on line 42. The amplified signals are supplied by way of line 52 to a high pass filter 54, and its output is fed by way of line 56 to an inverting amplifier 58. The output of this amplifier drives a full wave rectifier 60 by way of line 62, and the output of the rectifier is fed by way of line 64 to an RC integrating network 66 which filters and smooths the full wave rectifier output.

The output from integrator 66 is supplied by way of line 68 to the input of a conventional Schmitt trigger network 70 which produces a square wave pulse on its output line 72. The Schmitt trigger is fired each time a burst 24 (FIG. 2) of audio frequency information is received on line 42 and reverts to its initial state after a predetermined period of time, thereby producing a data bit pulse of predetermined length and amplitude for each audio frequency burst. The output from the Schmitt trigger is fed through a voltage divider 74 and produces a data bit pulse on line 46 which is connected to the microprocessor 48. The output of the Schmitt trigger is also supplied by way of line 72 to an edge detector 76 which produces, for example, a 100 microsecond pulse on its output line 78 at each level transition of the Schmitt trigger. The output signal on line 78 is supplied to a non-retriggerable monostable multivibrator which serves as a time base generator 80 and which produces an output pulse having a width of, for example, 18 milliseconds on line 82 each time the generator receives a trigger input on line 78. The output pulse is a time base pulse which is supplied by way of line 82 to the microprocessor 48.

The microprocessor receives the data bit pulses and the time base pulses on lines 46 and 82, respectively, and reconstructs the data word supplied by the lesson tape by using the time base pulses to define the start of a bit "cell". Any data pulse transitions which occur during a bit cell are considered by the processor to be a logic 1; if no data pulse transitions occur during the bit cell, the data is considered to be a logic 0. This is accomplished by feeding the data pulses on line 46 to an 8 bit counter located in the microprocessor. The leading edge of each time base pulse on line 82 is then used to reset the counter to a predetermined count in about the middle of the counter range; for example, a count of 128. Since the time base pulse is 18 microseconds long, the counter cannot again be reset to 128 for at least that length of time.

Immediately upon resetting by a time base pulse, the counter begins to count. It counts up from 128 toward its limit of 255 if the logic level of the data pulse on line 46 is high (1), and counts down from 128 toward 0 if the logic level of the data pulse is low (0). If the data within a given bit cell contains a zero; that is, has no transitions, then the counter will not change directions, but will continue to count either up or down until at the end of the cell the counter will be at or almost at either its highest available count of 255 or its lowest count of 0. On the other hand, if the data being received is a 1; i.e., if a transition of the data signal from its high to its low level (or vice-versa) occurred during the bit cell defined by the time base, the counter will count in one direction (up or down) until the transition occurs, and will then be reversed to count in the opposite direction until the end of the bit cell, at which time the counter will be at or near its original count of 128.

At the end of the bit cell, the microprocessor determines whether count is approximately 0 or approximately 255, in which case a data bit of zero is reconstructed. If it is determined that the count is at or near 128, a data bit of 1 is reconstructed. If the counts are not near either zero, 255, or 128, then invalid data is being supplied, and the microprocessor rejects the data. In this way, the time base generator blocks noise signals which either allow the counter to count too long in one direction or which cause transitions at the wrong time. This blocking can occur because the time base, once it is triggered, is longer than the time required for the desired data transition, which occurs halfway through the time cell. This prevents retriggering of the time base generator by the desired data transition and blanks out false data.

In the preferred form of the invention, the length of a bit cell is 24 milliseconds, or 12 cycles of 500 Hz carrier, and since the time base generator 82 is activated by the leading edge pulses from the data signals provided by the Schmitt trigger, the time base generator also has a cycle length of 24 milliseconds. However, the 18 millisecond length of the time base pulse encompasses the transition time for the data pulse, so that transitions are detected by the counter in the microprocessor. In this way, the system is self-clocking; that is, is asynchronous. The decoder thus serves to reconstruct digital data from the audio frequency tones carried by the lesson plan tape cassette and to produce amplitude transitions which can be used by the microprocessor for the reception and storage of digital information. This data is stored by the microprocessor in a random access memory (RAM) 84 for use by the microprocessor in carrying out the received instructions. The decoder circuitry is described in greater detail in the aforesaid U.S. application Ser. No. 352,917, the disclosure of which is hereby incorporated herein by reference.

Also connected to the microprocessor is a read only memory (ROM) 86 in which a variety of subroutines may be stored to become a permanent part of the master controller 12. Alternatively, subroutines may be supplied to the microprocessor 48 by means of data word control signals supplied by means of magnetic tape cassettes, whereby a microprocessor may be programmed to operate in accordance with any desired lesson plan without requiring extensive preprogramming of the microprocessor. As a further alternative, some of the subroutines may be permanently stored in the ROM, with suitable random access memory being provided to receive additional subroutine programs to permit variations, modifications, and expansion of the capabilities of the master controller.

Figure 4:
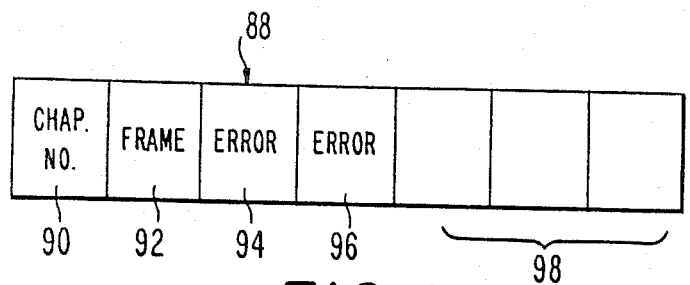
FIG. 4 is a diagrammatic illustration of a suitable progress display panel.

As previously explained, an exemplary subroutine preferably stored in the ROM 86 would be a "Display Select" subroutine wherein the processor responds to a data word to select a specific visual display frame and to cause a corresponding index to appear on suitable progress display lamps 88 connected to the microprocessor. The display 88 may be provided by any suitable lamp arrangement and in a preferred form is an LED (light emitting diode) array which provides alphanumeric readouts in conventional manner. Preferably, as illustrated in FIG. 4 the display contains segments 90 and 92 which provide chapter and frame index number readouts, respectively, and segments 94 and 96 which provide an error count by which the number of errors made by the operator may be recorded and displayed. The remaining display segments 98 provide a prescription readout which provides instructions to the operator of the system when a predetermined number of errors has been exceeded.

Another subroutine which may be stored in the ROM 86 is a "response go to" wherein the advancement of the lesson tape is delayed until the system operator enters a correct answer to a previous question. Thus, for example, after the information from a first data word has been entered into the microprocessor 48 and the narration portion has been played to provide audible instructions to the operator by way of loudspeaker 38, the microprocessor produces an output signal on line 100 which is connected by way of a plug 102 to the control jack of the tape recorder to halt the operation of the recorder until the operator enters a correct response.

Operator responses are entered into the master controller by means of a keyboard 104 which includes a plurality of keys 105 to 109. Typically, a voice narration segment will end with a question relating to the information previously given and related to the visual display images provided by the corresponding frame or page in the film strip 26 or booklet 28. The image on the film strip or book may be divided into a plurality of segments 105', 106', 107' and 108', each identified by a convenient symbol such as the symbols indicated on the manually operable keys 105 through 108, whereby the operator can answer the question by depressing a key carrying the symbol which corresponds to the correct answer on the visible display image. The depression of one of the keys produces a corresponding signal which is supplied by way of line 112 to the microprocessor, which compares the answer with the correct answer previously provided by the data word which preceded the voice narration. If the answer is correct, the microprocessor advances the tape 16 to enter the next data word into the random access memory 84. If the operator presses an incorrect key, an error is indicated on the display lamps 88, and the operator is required to depress another key until a correct answer is given. In this way, the operator is required to correctly answer each question before preceeding to the next.

Another subroutine preferably provided in the ROM 86 is the "Manual Go To" mode wherein the cassette 16 may be manually advanced or reversed by means of magnetic tape recorder 14. This routine, after being called by pressing control key 109, will synchronize the master controller 12 with the new part of the lesson available on cassette 16. This permits the operator to go to any desired chapter or frame in the lesson.

Still another preferred subroutine may be referred to as a "chapter header" mode which enables the microprocessor to respond to chapter header data control words on the tape cassette 16 and to store information relating to the threshold for the number of errors permitted in that chapter before a prescription occurs, identification of the prescription, and other information relating to the particular chapter.

Other subroutine modes of operation may be provided in ROM 86 as required. For example, a search mode subroutine may be provided to enable the microprocessor to produce a squelch signal on line 114, in response to a suitable instruction in the data work, to disable the audio amplifier 36 during the time that data words are being entered into the microprocessor. This routine may also produce a squelch signal upon activation of the advance button 109 so that the audio is blanked out during manual advancing of the cassette. This subroutine may also be used to provide an automatic search for specific chapters on the tape cassette 16. Such an arrangement may be provided through the use of a stereo tape recorder wherein one track is used to provide audio information in the manner described hereinabove, while the other track is used to provide indexing markers which can be used to locate particular chapters. In such a mode, the cassette would be automatically advanced or reversed while the microprocessor searched for specified chapter index signals. Such an arrangement would permit the operator to skip over certain parts of the lesson plan either on the basis of a preprogrammed lesson pattern or in response to answers provided by the operator.

Microprocessor 48 may be a conventional, commercially available programmable microprocessor having a memory capacity sufficient to accommodate the data word instructions and the various subroutines required for operation of the device. By arranging the lesson tape in the format described with respect to FIG. 2, wherein the data words are interspersed between the narration segments, a microprocessor of limited memory capacity can be used, since it is not necessary to store a great deal of data for any given lesson; the data is on the lesson tape. Alternatively, a microprocessor with greater memory capacity would permit the use of a lesson plan tape wherein the control information for the entire tape is included at the beginning of the tape and is entered into a random access memory at the beginning of the lesson. With such an arrangement, the various chapters would be identified simply by a shortened data word which would reference the previously stored information. The data supplied at the beginning of the lesson would include chapter headings, indexes for the corresponding visual displays, answers, prescriptions, and the like, all of which information would be stored in processor memory for access during the operation of the voice narration portion of the lesson. Even though this information is stored at the beginning of the lesson, it is still divided into corresponding chapters so that the system can monitor the operator responses on a chapter-by-chapter basis and provide variations in the program through the use of prescriptions, based on the operator response. Thus, for example, if in a given chapter the operator scores an excessive number of errors, the appropriate prescription for that chapter would be displayed and the operator required to return to an earlier chapter, go to another lesson plan, or follow some other predetermined action.

In order to restrict the response of the master controller to predetermined cassette tapes, an electronic key card 120 (FIG. 5) may be provided. This key card carries an electronic integrated circuit 122 having connectors 124 adapted to be connected in circuit, for example, with the ROM 86. The card may be connected to the ROM through an access port 126 having corresponding connections (not shown) whereby the circuit 122 is connected to the ROM 86 and forms a part thereof. Preferably, the circuit 122 is itself a low-capacity read only memory which carries data required to enable the master controller 12 properly to interpret the control data on a lesson plan tape to operate the microprocessor 48 and thus the master controller 12. Insertion of the key card into the access port 126 thus connects the circuit 122 into the ROM 86 and provides the information required to permit operation of the system. Preferably, the key card is individual to each lesson tape 16 so that both the tape and its corresponding key card are required to operate the system. This increases the safety of the system, for even if a key card were to be duplicated, it would be good only for a single lesson tape. Thus, the system is secured against unauthorized use and unauthorized duplication of the lesson plan.

Figure 5:
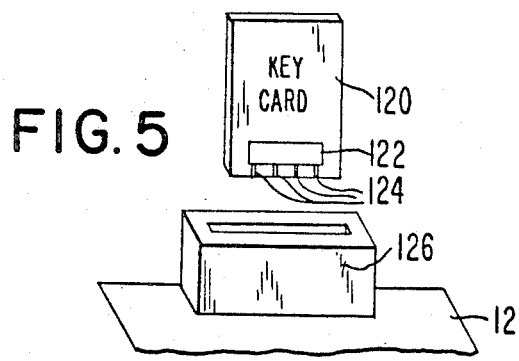
FIG. 5 is a diagrammatic illustration of a security key card usable with the system of FIG. 1.

In an alternative form, the key card 128 (shown in phantom in FIG. 1) may carry a magnetic strip 129 rather than the circuit 122 illustrated in FIG. 5, with the magnetic strip incorporating coded audio frequency information required for the operation of the system of FIG. 1. In such a case, the system may be provided with a card reader 130 (illustrated in phantom in FIG. 1) interposed between the tape recorder 14 and the master controller 12 and located in line 32. Insertion of the key card into the reader 130 would then produce a series of audio frequency signals which would be fed by the reader by way of line 32 to the decoder and then to the microprocessor 48 in the manner previously described to "unlock" the microprocessor and enable it to respond to following signals received from a lesson tape 16.

Figure 7:
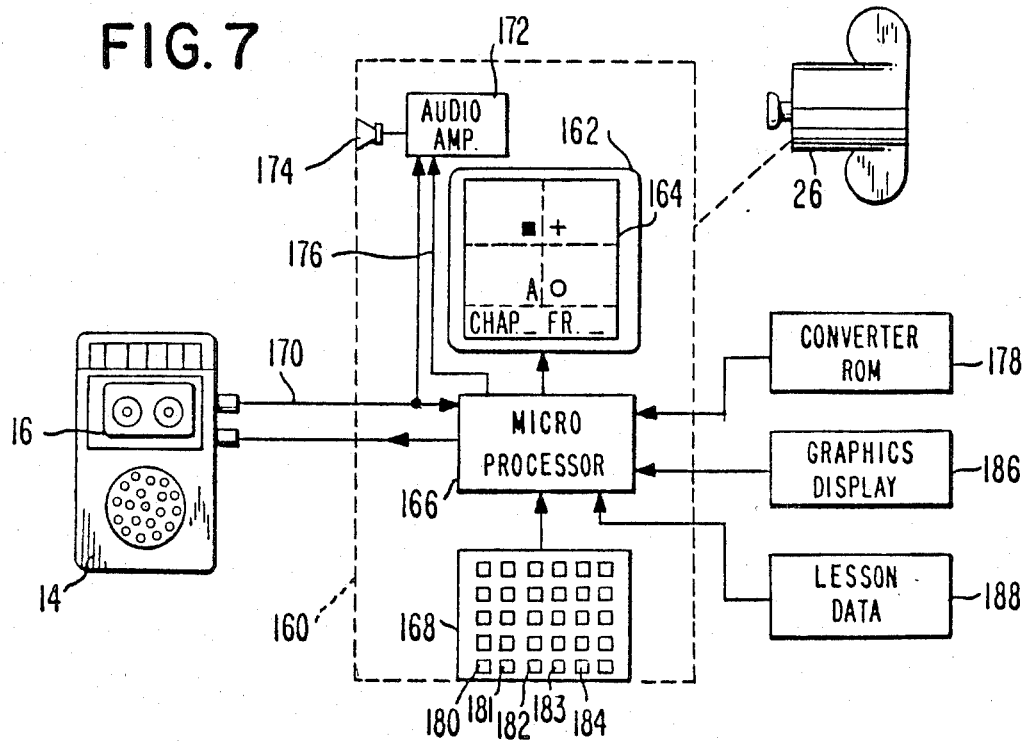
FIG. 7 is a diagrammatic illustration of a second alternative form of the invention utilizing a conventional programmable processor system.
Figure 8:
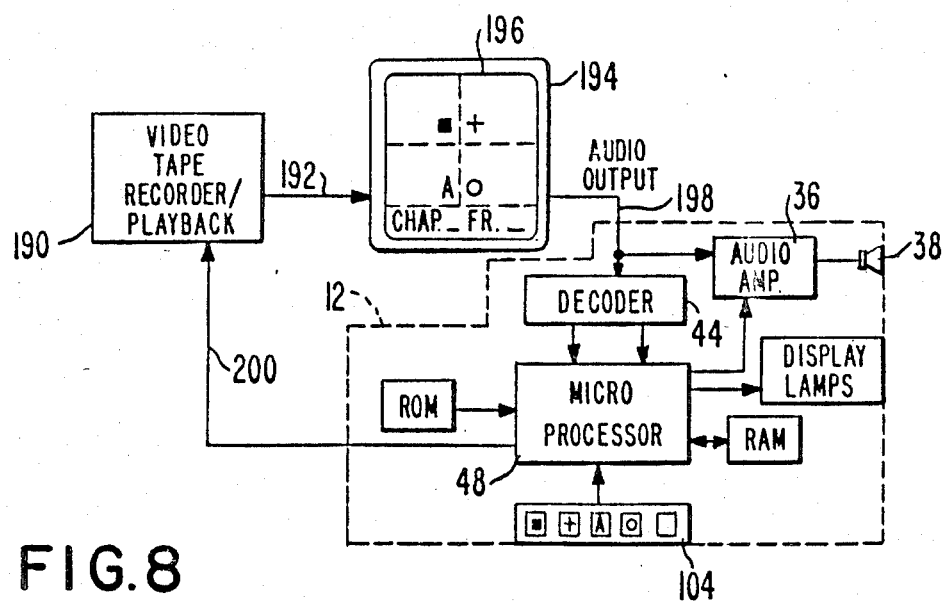
FIG. 8 is a diagrammatic illustration of still another form of the invention utilizing a video tape recorder and display system.

The system of FIG. 1 is disclosed in terms of a master controller containing a microprocessor which is specifically designed and programmed for use in the teaching and testing modes contemplated by the tutoring system of the present invention. However, the concepts involved herein are adaptable to preexisting programmable microprocessors whose primary function may be quite different than that of the audio-visual tutoring system of the present invention. If the microprocessor in such a preexisting system contains sufficient memory capacity, it may be adapted for use with the present invention as an adjunct to the master controller of FIG. 1, and used for the purpose, for example, of providing the required visual display images. Alternatively, a suitable ROM pack containing the complete programs required to operate the present invention may then be connected to the preexisting microprocessor to convert that device to function as an integral part of the present invention. Such variations are illustrated in FIGS. 6, 7 and 8, to which reference is now made.

Figure 6:
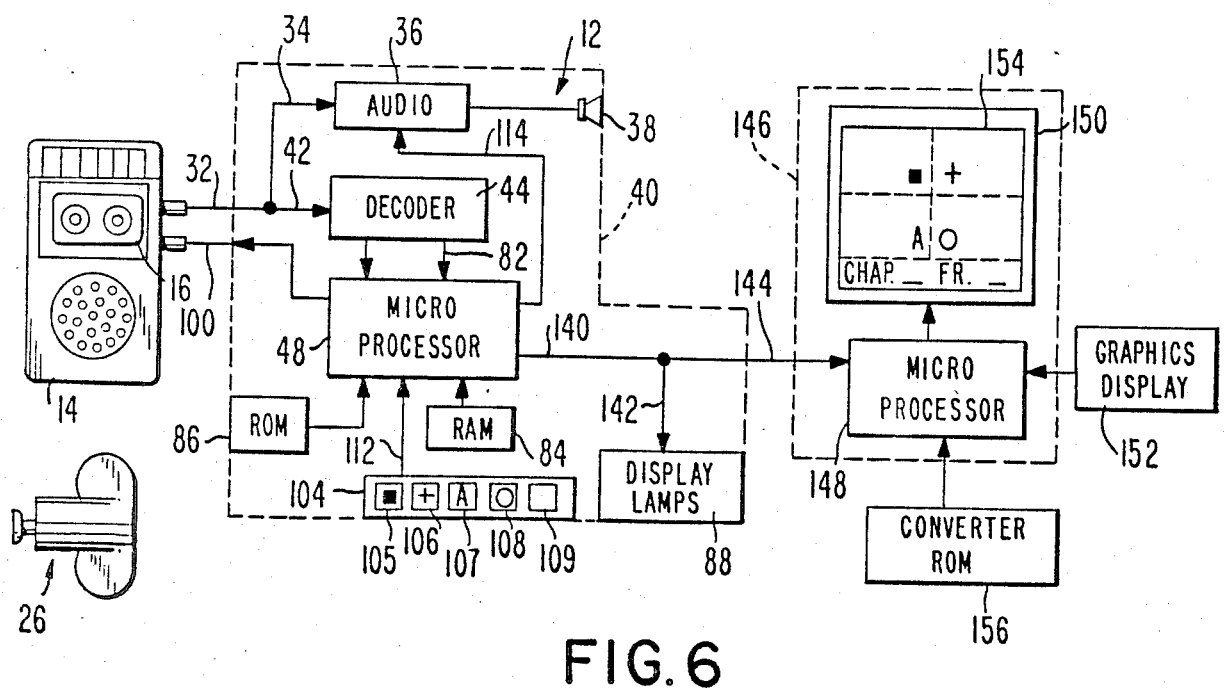
FIG. 6 is an alternate form of the system of FIG. 1, utilizing a master control circuit in combination with an existing processor system.

In the system of FIG. 6, the master controller is adapted for use in combination with a preexisting microprocessor which provides a display on a video monitor, whereby such a monitor may be used in addition to or in place of the film strip, booklet, or the like used with the system of FIG. 1. In the system of FIG. 6, portions of the system which are identical to the system of FIG. 1 carry identical numbers for convenience in reference. Thus, the system of this figure incorporates a master controller 12 to which is connected a portable tape recorder 14. Audio frequency signals are supplied by means of a cassette 16 in the recorder 14, through an input line 32 to an audio amplifier 36, whereby narrative portions of a lesson are reproduced by means of loudspeaker 38. The audio frequency control signals are supplied by way of line 42 through decoder 44 to the microprocessor 48 for storage in the random access memory 84, as previously explained. The microprocessor 48 produces an output on line 140 which not only supplies information to the progress display lamps 88 by way of line 142, but also provides an output signal by way of line 144 which may be connected to a conventional computer system 146 utilizing a microprocessor 148 and a video display unit 150. The computer unit 146 is shown in simplified form, and may be any of numerous commercially available units which incorporate a microprocessor capable of providing video displays suitable for use with the lesson program on the lesson plan tape 16.

In order to provide the desired display on the video monitor 150, it may be necessary to provide suitable graphic display programs to the microprocessor by way of a graphics program which may be supplied to the processor 148 and stored in random access memory. Such a program may be provided by means of a graphics display input 152 which may be in the form of a ROM pack, a magnetic tape input, or like peripheral equipment. The program provided by graphic unit 152 produces the equivalent of the images provided by the film strip or booklet utilized in the system of FIG. 1. Thus, the images are displayed on the monitor screen 154 in a segmented format of the type illustrated in booklet 128 (FIG. 1) and further illustrated on the screen 154 in FIG. 6. As shown, each segment of the display is identified by a symbol corresponding to one of the symbols carried by the manual keyboard keys 105, 106, 107 and 108 to facilitate operator response to questions relating to the displayed images.

If desired, the graphic display on the video monitor screen 154 may be limited to alpha-numeric displays, in which case the system of FIG. 6 would preferably be used in conjunction with the film viewer 126 and/or the booklet 28. Such an arrangement would allow the lesson plan to provide instructions and ask questions concerning the relationship between visual images on the film strip and word displays on the video monitor.

In order to enable the microprocessor 148 to respond to the information signals produced by the master controller 12, a converter program is required for processor 148. Such a converter program may be supplied by means of a converter ROM 156 which again may be in the form of a ROM pack connected to the microprocessor in conventional manner. Alternatively, the converter program may be supplied to the microprocessor by means of any other known input device. Such a converter program is specific to the computer system 146 and enables the microprocessor 148 to respond to chapter and frame signals on line 144 to produce on monitor screen 154 the desired graphic display images.

The system of FIG. 6 is particularly useful in conjunction with relatively simple computer systems 146 in which the microprocessor 148 is of limited memory capacity, for the master controller 12 carries out most of the information handling procedures required, while computer 146 essentially operates as a display device. However, such an arrangement provides a useful addition to existing computer systems and by means of a simple converter program and the use of the master controller 12, enables such computers to function in accordance with the present invention.

FIG. 7 illustrates an embodiment of the invention where a more powerful computer system is available for use with the teaching and testing methods of the present invention. In this case, means are provided to enable the existing computer system to respond directly to the audio frequency signals provided by a lesson plan tape, with a converter program being utilized to enable the computer system to function in the desired manner. Accordingly, there is illustrated in FIG. 7 a conventional home computer system 160 such as the commercially available TRS-80 system available from Radio Shack Corporation. The system incorporates, among other things, a video monitor 162 having a display screen 164, a microprocessor 166 adapted to control the display on the monitor, and an input keyboard 168, all of which are illustrated in diagrammatic form. The microprocessor 166 is adapted to receive audio frequency input signals by way of input line 170 connected from a conventional tape recorder 14 capable of playing back the lesson plan cassette 16. The input signals on line 170 are supplied to the microprocessor 166 and to the audio section of the computer 160 so that the narrative portion of the lesson plan will be audibly reproduced by a loudspeaker 174. As in previous systems, a squelch signal may be supplied to the audio stage 172 by way of line 176 to prevent audio frequency signals representing control data from being played back by loudspeaker 174.

The microprocessor 176 is adapted to receive a converter program from a converter ROM pack 178 which supplies to the processor the program information which enables the microprocessor to convert the incoming audio frequency signals to data pulses usable by the microprocessor. Alternatively, a decoder such as that illustrated in FIG. 3 may be utilized. The converter ROM also supplies programming to enable the microprocessor to respond to chapter and frame data to produce on the monitor screen 164 the graphic display images required for the lesson being played by the tape recorder 14. These graphics are supplied to the microprocessor by a suitable graphics display input 180 in the manner described with respect to FIG. 6.

The converter ROM also identifies selected keys on the keyboard 168 to serve the function of the manual keyboard 104 illustrated in FIG. 1, and thus may select keys 180 to 184 to perform the same functions as keys 105–109.

Finally, the microprocessor 166 is supplied with the various subroutines utilized in the system of the present invention and discussed above with respect to FIG. 1. These subroutines are provided by means of a lesson data pack 188 which may be in the form of floppy discs, or other suitable input devices capable of supplying to the microprocessor the required program information.

With the microprocessor 166 programmed to hold in memory the various subroutines required for the method of the present invention, and further programmed to respond to audio frequency control data from a lesson tape, the system of FIG. 7 is capable of functioning essentially in the manner described with respect to FIGS. 1 and 6.

It will be understood that the device of FIG. 7 may utilize graphic displays which illustrate the entire image to be used in a particular program, or may be utilized in conjunction with a film strip viewer 26, a booklet 28, or the like.

A further embodiment of the present invention is illustrated in FIG. 8, wherein the desired graphic display images are provided by means of a conventional video tape recorder and playback machine 190. The output of video machine 190 is supplied by way of output line 192 to a conventional television set 194 which then provides on its screen 196 the visual displays which correspond to the narrative portion of the lesson plan. The lesson plan is recorded on the audio portion of the video tape and is also supplied to the television set by way of line 192. The audio frequency signals are fed to the audio portion of the television set and appear at the audio output of the set. This audio output, which may be a phono-jack or the like for headphones, is connected by way of line 198 to a master controller 12, previously described with respect to the embodiments of FIGS. 1 and 6.

The audio frequency signals from the television set are supplied to the audio amplifier 36 and to the decoder 44 in the controller 12, whereby audio frequency narrative signals are supplied to the loudspeaker 38 and audio frequency data words are supplied to the microprocessor 48. In the manner described with respect to the tape recorder 14, the video tape machine 190 is controlled by the microprocessor 48 by way of control output 200, whereby the tape machine may be advanced, reversed, or stopped in accordance with the lesson control plan as modified by operator responses to questions and resulting prescriptions.

Figure 9:
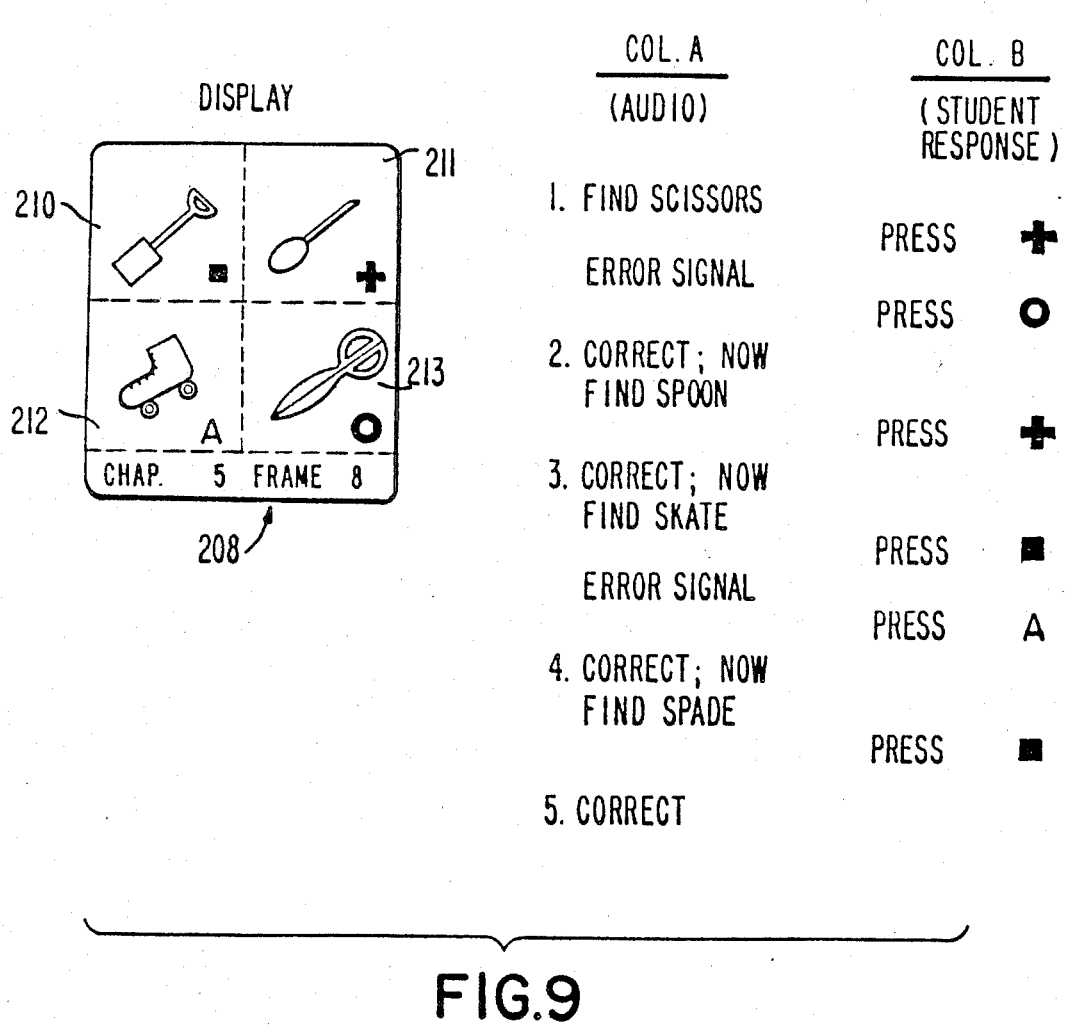
FIG. 9 is a diagrammatic illustration of a lesson plan in accordance with the present invention.

An example of the type of lesson plan which may conveniently be provided in accordance with the present invention is illustrated in FIG. 9 wherein a visual display 208 provides images 210, 211, 212 and 213. These display images are of the type that might be used, for example, to teach an individual the English language. The display illustrated in FIG. 9 may represent a chapter or a portion of a chapter of a particular lesson plan which is designed to teach the student the English language word for each of the displayed images. It will be understood that these images may be shown on a single frame of a film strip, on a page of a booklet, or on a suitable video monitor, and in each case each image of the display will include a corresponding visual symbol by which a specified image may be selected on the manual keyboard 104 or its equivalent. In column A of FIG. 9 is a sequence of exemplary questions or instructions that might be contained on the narrative portion of the lesson plan tape. In column B of FIG. 9 there is indicated a possible student response to each narrative segment, as it would be indicated on the keyboard 104.

Before the sequence of narrative questions can be played through any of the herein-disclosed systems, however, the control data for a particular lesson chapter must be entered so that the microprocessor system "knows" what the chapter is, what the error threshold is and what action should be taken if this error threshold is exceeded. Without this prior information the system would not be able to evaluate the operator's responses.

After loading this "chapter header" data word, the microprocessor will load another control data word which will cause the display lamps 88 to indicate that the visual display should be turned to chapter 5, frame 8, in this example. The lesson tape then pauses for a selected period of time to allow the operator to locate the display frame indicated by display lamps 88. If the system utilizes a video display, the microprocessor indication of chapter and frame will result in the automatic calling up of the appropriate display. Then the tape is advanced to produce the first voice output from loudspeaker 38. For example, the first voice instruction may be to "find scissors". After that, the tape 16 will provide another data word to the master controller 12. The data word will cause the master controller to stop the tape and await a response. The data word will also inform the master controller 12 as to what response or responses are required and what frame should be displayed by lamps 88 if the correct response(s) is given.

In this case, if the operator presses key 106, which corresponds to image 211 of frame 8, an error signal will be generated and will be displayed by progress display lamp 88. If desired, this error signal may also be accompanied by an appropriate audible signal. This will indicate to the operator that image 211 was incorrect, and that another selection must be made. If the operator then depresses key 108, corresponding to image 213, the master controller will cause the lesson plan tape to advance and produce the next audible instruction which may be "correct; now find spoon" and which will be followed by another data word to stop the tape, determine correct responses and select the next display.

If the operator responds to the latter instruction by depressing key 106, the tape will then be advanced to the next audible instruction and data word. The lesson continues in this manner until the operator has answered correctly all of the questions relating to chapter 5, at which time a new chapter header data word will be inserted into the master controller, changing the chapter error threshold and prescription.

If the operator commits an excessive number of errors in attempting to follow the instructions relating to chapter 5, a prescription instruction will appear on the display 88. This prescription will be in accordance with the control data entered at the beginning of the chapter and may instruct the operator to begin the chapter again, go to another chapter, select another lesson plan tape, or the like. Thus, the present invention not only provides a predetermined lesson sequence for teaching the desired material, but allows a change in the sequence, branching of a planned sequence into another program, repetition of a lesson until it is learned, selection of a new lesson, and like variations of the preplanned lesson sequence, whereby the teaching program is varied to meet the needs of the individual student.

Although the present invention has been described in terms of preferred embodiments thereof, it will be apparent to those of skill in the art that numerous variations and modifications can be made without departing from the true spirit and scope thereof as defined in the following claims:

What is claimed is:

1. An audio-visual system for teaching and testing students wherein the display of visual information is coordinated with related audio information in the form of voice narration to provide structured teaching of material and testing of students, and wherein the teaching and testing sequences are varied through branching and repetition in accordance with student response, comprising:
   a magnetic lesson storage medium for receiving lesson plan information in the form of narration signals and encoded control data signals arranged in chapters, said narration signals providing predetermined audio information segments and said control data signals providing information concerning visual displays to be associated with specified audio information segments, the control data signals for each chapter establishing a predetermined lesson sequence for that chapter, providing correct response information for use in determining student progress, and providing prescriptions for specified student responses, whereby a predetermined lesson sequence can be varied in accordance with student response;
   controller means including microprocessor means responsive to said lesson storage medium control data signals for operating the audio visual system in accordance with the lesson plan of said lesson storage medium;
   key card means connected to said controller means for preventing unauthorized operation of said system, said key card means including a removable memory card carrying selected control data signals required for operations of said controller means;
   visual display means including images corresponding to predetermined audio information segments and further including visible indexing means on each image for associating each image with at least one audio information segment;
   signal means for manually selecting the visible indexing means of a desired image; and
   display means for displaying an identifier corresponding to the selected indexing means of a desired image, whereby a student can select the image required for a corresponding audio information segment.

2. The system of claim 1, wherein said visual display means includes means responsive to said control data signals for automatically selecting and displaying images corresponding to said audio information segments.

3. The system of claim 1, wherein said microprocessor means includes memory means for receiving and storing preprogrammed control data, said memory means being further responsive to said encoded control data signals from said lesson storage medium to call up selected stored preprogrammed control data for said system.

4. The system of claim 3, wherein said memory means is a ROM pack for adapting said encoded control data signals for use with said microprocessor.

5. The system of claim 1, wherein said key card means includes a different removable memory card for each said magnetic lesson storage medium, whereby only the holder of a corresponding memory card can operate a given magnetic lesson storage medium in said system.

6. The system of claim 5, wherein said controller includes removable read only memory means containing a program corresponding to said microprocessor means to program general purpose microprocessor for response to said encoded data signals of said lesson storage medium.

7. The system of claim 5, wherein said microprocessor is preprogrammed with subroutines usable in said teaching system, said control data signals selecting said subroutines as required to operate said teaching system.

8. The system of claim 5, wherein said control data signals on said lesson storage medium are audio frequency signals.

9. The system of claim 1, wherein said storage medium is a magnetic recording tape.

10. The system of claim 9, wherein said visual display means comprises a book having the images required for a specified lesson plan.

11. The system of claim 9, wherein said visual display means comprises video graphics display means.

12. The system of claim 1, wherein said visual display means comprises a book having the images required for a specified lesson plan.

* * * * *